US012391359B2

(12) United States Patent
Jacqus et al.

(10) Patent No.: US 12,391,359 B2
(45) Date of Patent: Aug. 19, 2025

(54) SEAL FOR A GLAZED ELEMENT OF AN AIRCRAFT

(71) Applicant: SAINT-GOBAIN GLASS FRANCE, Courbevoie (FR)

(72) Inventors: Gary Jacqus, Paris (FR); Volodymyr Iurasov, Vincennes (FR); Sylvain Berger, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 37 days.

(21) Appl. No.: 18/557,671

(22) PCT Filed: Apr. 29, 2022

(86) PCT No.: PCT/FR2022/050834
§ 371 (c)(1),
(2) Date: Oct. 27, 2023

(87) PCT Pub. No.: WO2022/229580
PCT Pub. Date: Nov. 3, 2022

(65) Prior Publication Data
US 2024/0208636 A1   Jun. 27, 2024

(30) Foreign Application Priority Data
Apr. 29, 2021  (FR) ..................... 2104520

(51) Int. Cl.
*B64C 1/14* (2006.01)
*B64C 1/40* (2006.01)

(52) U.S. Cl.
CPC .............. *B64C 1/1492* (2013.01); *B64C 1/40* (2013.01)

(58) Field of Classification Search
CPC ............ B64C 1/40; B64C 1/14; B64C 1/1492
See application file for complete search history.

(56) References Cited

U.S. PATENT DOCUMENTS

| 2002/0113168 A1* | 8/2002 | Rukavina | B64C 1/1492 |
| | | | 244/129.3 |
| 2006/0165977 A1* | 7/2006 | Rehfeld | B32B 17/10761 |
| | | | 428/354 |

(Continued)

FOREIGN PATENT DOCUMENTS

| EP | 1 647 481 A2 | 4/2006 |
| FR | 2 843 227 A1 | 2/2004 |

(Continued)

OTHER PUBLICATIONS

International Search Report as issued in International Patent Application No. PCT/FR2022/050834, dated Jul. 27, 2022.

(Continued)

*Primary Examiner* — Tye William Abell
(74) *Attorney, Agent, or Firm* — Pillsbury Winthrop Shaw Pittman LLP

(57) ABSTRACT

A seal of a glazed element of an aircraft, the seal being configured to receive an edge of a first glazed unit, the first glazed unit having a first face, the seal including a first surface adapted to be mounted on the first face so as to receive the first glazed unit, wherein the seal includes a first damping part, the first damping part including the first surface, and wherein a first material forming the first damping part has a first loss factor $\eta_1$ strictly greater than 0.10.

19 Claims, 5 Drawing Sheets

(56) References Cited

U.S. PATENT DOCUMENTS

| | | | | |
|---|---|---|---|---|
| 2006/0165997 | A1* | 7/2006 | Tevis | B05D 7/574 |
| | | | | 427/372.2 |
| 2007/0069080 | A1* | 3/2007 | Rassaian | B64C 1/1484 |
| | | | | 244/129.3 |
| 2010/0123043 | A1* | 5/2010 | Neple | E06B 5/205 |
| | | | | 244/129.3 |

FOREIGN PATENT DOCUMENTS

| | | |
|---|---|---|
| FR | 2 858 282 A1 | 2/2005 |
| FR | 2 914 589 A1 | 10/2008 |

OTHER PUBLICATIONS

Mironov, M. A., "Propagation of a flexural wave in a plate whose thickness decreases smoothly to zero in a finite interval," Soviet Physics Acoustics—USSR, 34(3), May-Jun. 1988, pp. 318-319.

\* cited by examiner

[Fig. 1]
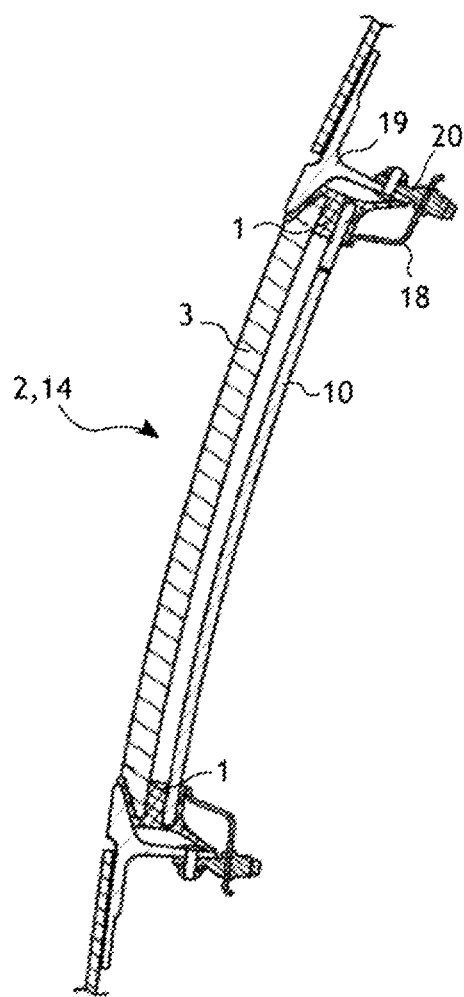
PRIOR ART

[Fig. 2]
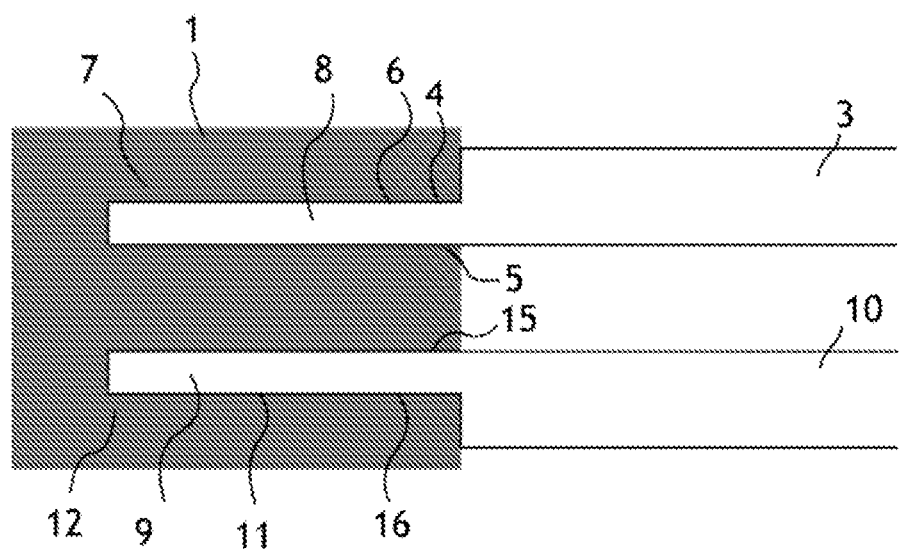
[Fig. 3]
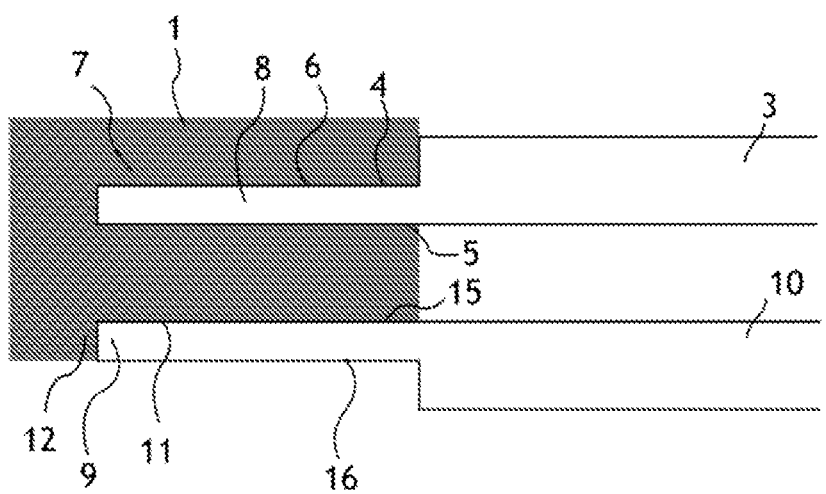

[Fig. 4]
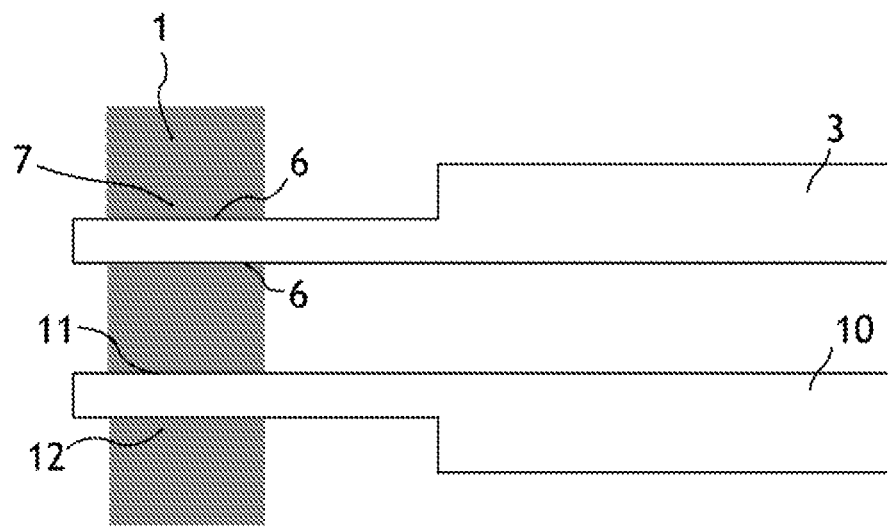
[Fig. 5]
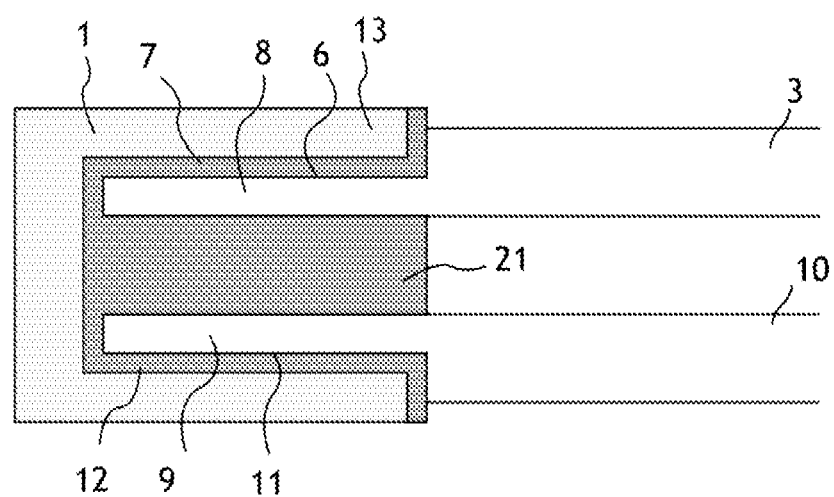

[Fig. 6]
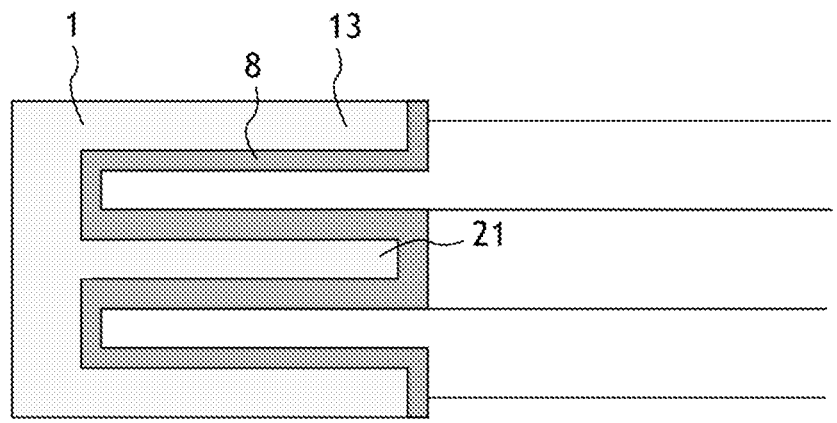
[Fig. 7]
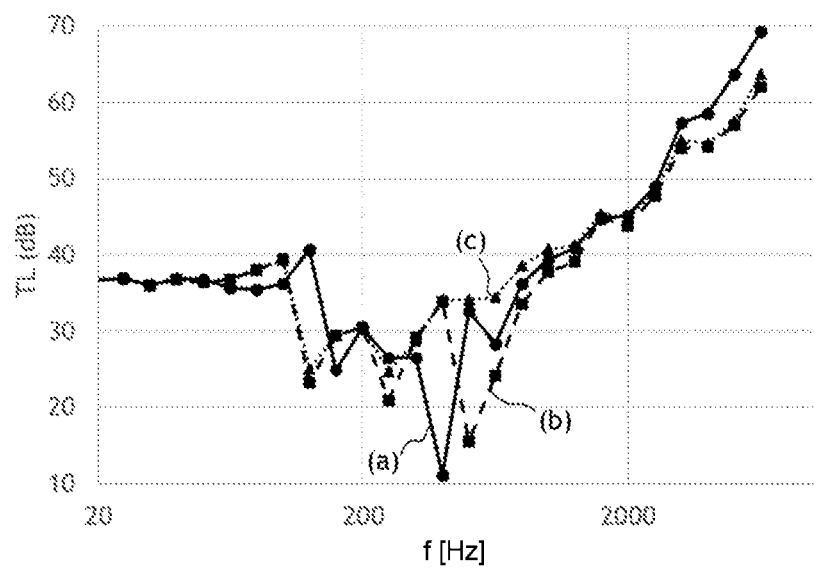

[Fig. 8]
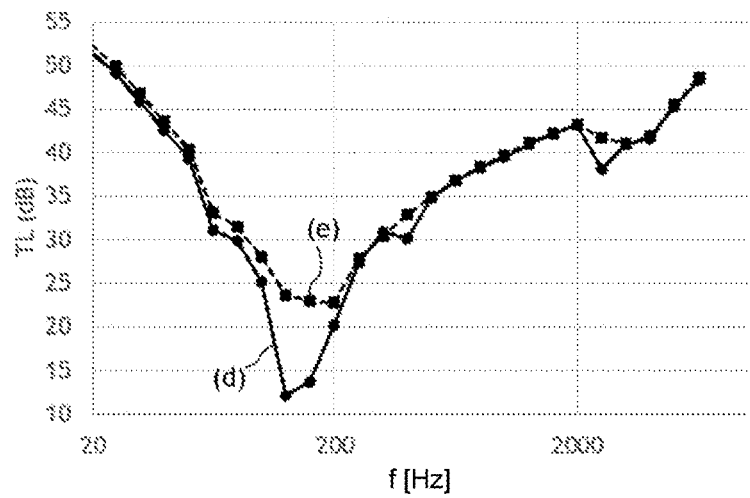
[Fig. 9]
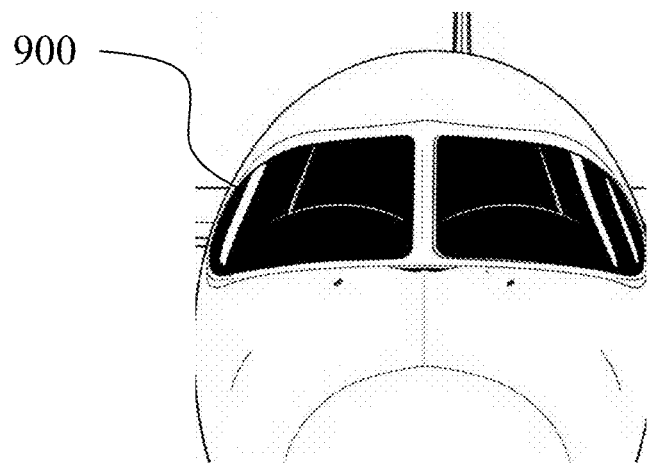

SEAL FOR A GLAZED ELEMENT OF AN AIRCRAFT

FIELD OF THE INVENTION

The present invention relates to a seal for a glazed element of an aircraft having sound insulation properties, and more particularly a window or an aircraft windshield having such properties.

STATE OF THE ART

Referring to FIG. 1, it is known to mount a glazed element 2, preferably a window 14 or a windshield, to the fuselage of an aircraft. The window 14 may comprise a first exterior glazed unit 3, and a second interior glazed unit 10, which are mounted on a metal frame 19 in a seal 1. The seal 1 covers the edge of each of the first glazed unit 3 and of the second glazed unit 10. The seal 1 is held by a metal profile 18 mounted on an articulation 20 which is fixedly mounted to the metal frame 19.

The sound insulation of a glazed element of an aircraft may depend on several parameters: a variation in the temperature outside the aircraft, a variation in temperature inside the aircraft, mechanical stresses at the limit of the glazed element, the geometry and the composition of the glazed element, and/or a variation of the characteristics of the materials of the glazed element with the temperature and the mechanical stresses imposed on the glazed element. Thus, the modeling of the sound insulation properties of a glazed element can be complex.

It is known to improve the sound insulation of an aircraft glazed element by increasing the thickness of a glazed unit of the glazed element.

However, the increase in the thickness of the first exterior glazed unit 3 is limited by the size of the first glazed unit 3 in the window 14 and by the increase in costs that this increase in thickness causes during the manufacture of the window 14.

OVERVIEW OF THE INVENTION

One aim of the invention is to propose a seal enabling a glazed element to have sound insulation properties greater than those of known glazed elements, at least in a frequency range comprised in the audible frequency spectrum.

This aim is achieved within the scope of the present invention by means of a seal of an aircraft glazed element, the seal being configured to receive an edge of a first glazed unit, the first glazed unit having a first face, the seal comprising a first surface adapted to being mounted on the first face so as to receive the first glazed unit, the seal comprising a first damping part, the first damping part comprising the first surface, a first material forming the first damping part having a first loss factor $\eta_1$ strictly greater than 0.10.

The present invention is advantageously completed by the following features, taken individually or in any of their technically possible combinations:
  the first surface is adapted to be mounted on the first face and on a second face of the first glazed unit opposite the first face, so as to receive the first glazed unit,
  the seal is configured to receive an edge of a second glazed unit, the second glazed unit having a third face and a fourth face opposite the third face, the seal comprising a second surface adapted to be mounted on the third face and preferentially on the fourth face so as to receive the second glazed unit, the seal comprising a second damping part, the second damping part comprising the second surface, a second material forming the second damping part having a second loss factor $\eta_2$ strictly greater than 0.10,
  the seal comprises a first recess able to receive the edge of the first glazed unit so as to surround the first glazed unit, the first recess comprising the first damping part,
  the seal comprises a second recess capable of receiving an edge of a second glazed unit so as to surround the second glazed unit, the second recess having a second surface suitable for being in contact with the edge of the second glazed unit, the second recess comprising a second damping part, the second damping part comprising the second surface, a second material forming the second damping part having a second loss factor $\eta_2$ greater than 0.10,
  the first recess forms a notch in the seal,
  the second recess forms a notch in the seal,
  a value of the real part E' of the Young's modulus of the first material is less than 100 MPa, in particular less than 10 MPa,
  a value of the real part E' of the Young's modulus of the second material is less than 100 MPa, in particular less than 10 MPa,
  the seal is formed of a single material monolithically,
  the seal comprises a holding part different from the first damping part, the holding part being configured to be in contact with an element integral with a wall of the aircraft, a third material forming the holding part having a third loss factor $\eta_3$ strictly less than the first loss factor, and in particular strictly less than 0.10,
  the first loss factor $\eta_1$ is greater than 0.20, and preferentially greater than 0.50,
  a value of the real part E' of the Young's modulus of the first material is less than 10 MPa, in particular strictly less than 1 MPa,
  the seal is entirely formed by one or more visco-elastic materials,
  the third material is a visco-elastic material, Another aspect of the invention is an aircraft glazed element, comprising a seal according to one embodiment of the invention, and a first glazed unit, the first surface being mounted on the first face so that the seal receives the first glazed unit.

Advantageously, the first surface is mounted on the second face of the first glazed unit so that the seal receives the first glazed unit.

Advantageously, the glazed element comprises a second glazed unit, the second glazed unit having a third face and a fourth face opposite the third face, the second surface of the seal being mounted on the third face and preferentially on the fourth face of the second glazed unit so that the seal receives the second glazed unit.

Another aspect of the invention is an aircraft window, comprising a glazed element according to one embodiment of the invention, the glazed element further comprising a second glazed unit, the second glazed unit having a third face and a fourth face, the seal comprising a second surface adapted to be mounted on the third face and preferentially on the fourth face so as to receive the second glazed unit.

Advantageously, the first glazed unit and/or the second glazed unit of the window is a monolith, preferentially formed from polymethyl methacrylate.

Another aspect of the invention is an aircraft windshield, comprising a glazed element according to one embodiment of the invention, wherein the first glazed unit is a laminated glazed unit.

DESCRIPTION OF THE FIGURES

Other features, purposes and advantages of the invention will emerge from the following description, which is purely illustrative and non-limiting, and which must be read in conjunction with the appended drawings in which:

FIG. 1 schematically shows a cross-section of a known aircraft window,

FIG. 2 schematically shows a detail of a cross-section of a glazed element according to one embodiment of the invention, FIG. 3 schematically shows a detail of a cross-section of a glazed element according to one embodiment of the invention, FIG. 4 schematically shows a detail of a cross-section of a glazed element according to one embodiment of the invention, FIG. 5 schematically shows a detail of a cross-section of a glazed element according to one embodiment of the invention, FIG. 6 schematically shows a detail of a cross-section of a glazed element according to one embodiment of the invention, FIG. 7 shows a sound insulation as a function of the frequency of a sound wave through known windows and through a window according to an embodiment of the invention, FIG. 8 shows a sound insulation as a function of the frequency of a sound wave through a known windshield and through a windshield according to an embodiment of the invention, and FIG. 9 schematically shows an aircraft windshield.

In all the figures, similar elements are marked with identical references.

Definitions

"Loss factor $\eta$" of a material means, the material having a complex Young's modulus, the ratio between the imaginary part E" of the Young's modulus of the material and the real part E' of the Young's modulus of the material. The loss factor $\eta$ of a material is defined by international standard ISO 18437-2:2005 (*Mechanical vibration and shock—Characterization of the dynamic mechanical properties of viscoelastic materials—Part 2: Resonance method*, part 3.2). Preferentially, the loss factor $\eta$ can be defined for a predetermined frequency. "A material has a first loss factor $\eta$ greater than a value" means that the material has a first loss factor $\eta$ greater than the value for each of the frequencies in the audible frequency range, that is in a frequency range extending between 20 Hz and 20,000 Hz, inclusive, and preferentially between 20 Hz and 10 KHz, inclusive.

"The real part E' of the Young's modulus of a material is greater than a value" means that the real part E' of the Young's modulus of the material is greater than the value of the real part E' of the Young's modulus of the material for each of the frequencies in the audible frequency range, that is in a frequency range extending between 20 Hz and 20,000 Hz, inclusive, and preferentially between 20 Hz and 10 KHz, inclusive.

The real part E' and the imaginary part E" of the Young's modulus can be defined for a predetermined temperature. The temperature range considered in the present invention is comprised between −90° C. and 60° C. In the present invention, "the real part E' of the Young's modulus of a material is greater than a value" means that the material has a real part E' of the Young's modulus greater than the value for each of the temperatures comprised between −90° C. and 60° C. In the present invention, "a material has a first loss factor $\eta$ greater than a value" means that the material has a first loss factor $\eta$ greater than the value for each of the temperatures comprised between −90° C. and 60° C.

A dynamic characterization of a material is carried out on a visco-analyzer of the Metravib visco-analyzer type, under the following measurement conditions. A sinusoidal load is applied to the material. A measurement sample made of the material to be measured consists of two rectangular parallelepipeds, each parallelepiped having a thickness of 3.31 mm, a width of 10.38 mm and a height of 6.44 mm. Each parallelepiped formed by the material is also referred to as a shear "test specimen". The excitation is implemented with a dynamic amplitude of 5 μm around the rest position, covering the frequency range comprised between 5 Hz and 700 Hz, and covering a temperature range comprised between −90° C. and +60° C.

The visco-analyzer makes it possible to subject each test specimen (each sample) to deformations under precise temperature and frequency conditions, and to measure the displacements of the test specimen, the forces applied to the test specimen and their phase shift, which makes it possible to measure rheological quantities characterizing the material of the test specimen.

The use of measurements makes it possible especially to calculate the Young's modulus E of the material, and particularly the real part E' of the Young's modulus and the imaginary part E" of the Young's modulus of the material, and thus to calculate the tangent of the loss angle (or loss factor) $\eta$ (also referred to as tan δ).

A value of the real part E' of the Young's modulus and/or a loss factor $\eta$ of a material are measured without the material being pre-stressed.

"Glazed unit" is understood to mean a structure comprising at least one sheet of organic or mineral glass, preferentially adapted for being mounted in an aircraft.

The glazed unit can comprise a single glass sheet or a multilayer glazed assembly at least one sheet of which is a glass sheet.

A glazed unit may comprise an organic glass sheet. Preferably, the organic glass is formed by a compound comprising acrylates, preferably by polymethyl methacrylate (PMMA). It also can be formed by polycarbonate.

A glazed unit can comprise a glazed assembly. The glazed assembly comprises at least one glass sheet. The glass can be organic or mineral glass. The glass can be tempered. The glazed assembly is preferably a laminated glazed unit. "Laminated glazed unit" is understood to mean a glazed assembly comprising at least two glass sheets and an interlayer film formed of plastic material, preferentially viscoelastic, separating the two glass sheets. The interlayer film made of plastic material can comprise one or more layers of a visco-elastic polymer such as polyvinyl butyral (PVB) or an ethylene-vinyl acetate copolymer (EVA). The interlayer film is preferably made of standard PVB or of acoustic PVB (such as single-layer or tri-layer acoustic PVB). Acoustic PVB can comprise three layers: two outer layers of standard PVB and an inner layer of PVB with added plasticizer so as to make it less rigid than the outer layers.

DETAILED DESCRIPTION OF THE INVENTION

General Architecture of the Seal 1 and the Glazed Element 2

Referring to FIG. 2, a seal 1 according to one embodiment of the invention is configured to receive an edge of a first glazed unit 3. The first glazed unit 3 comprises a first face 4 and a second face 5 opposite the first face 4. The seal 1 may be entirely formed by one or more visco-elastic materials.

The seal 1 comprises a first surface 6 adapted to be mounted on the first face 4 of the first glazed unit 3 so as to receive the first glazed unit 3. When the first glazed unit 3 is mounted to the seal 1, the first glazed unit 3 is in contact with the seal 1 on the first surface 6.

The seal 1 comprises a first damping part 7. The first damping part 7 comprises the first surface 6.

A first material forming the first damping part 7 has a first loss factor $\eta_1$ strictly greater than 0.10, in particular greater than 0.15, and preferentially greater than 0.20.

Indeed, the inventors have discovered that when the glazed unit is held, preferentially only, by a first material having a loss factor greater than 0.10, in particular greater than 0.15, and preferentially greater than 0.20, the sound insulation through the glazed element 2 significantly increases at least in frequency ranges comprised in the audible frequency range. Thus, due to the viscous dissipation properties of the seal 1, the soundproofing of an aircraft glazed element 2 can be increased.

Another aspect of the invention is an aircraft glazed element 2 comprising a seal 1 and a first glazed unit 3, the first surface 6 being mounted on the first face 4 so that the seal 1 receives the first glazed unit 3.

With reference to FIGS. 2 to 6, the first surface 6 may be adapted to be mounted on the first face 4 and on a second face 5 of the first glazed unit 3 opposite the first face 4, so as to receive the first glazed unit 3. Thus, the first damping part 7 can hold two opposite faces of the first glazed unit 3 so as to avoid the adhesion of the first glazed unit 3 to the seal 1 while allowing an increase in the sound insulation through a glazed element formed at least by the first glazed unit 3 and by the seal 1.

The seal 1 can be configured to receive an edge of a second glazed unit 10. The second glazed unit 10 has a third face 15 and a fourth face 16 opposite the third face 15. The seal 1 then comprises a second surface 11 adapted to be mounted on the third face 15, and preferentially on the fourth face 16, so as to receive the second glazed unit 10. Thus, it is possible to increase the sound insulation of a double glazed unit assembly comprising the seal 1.

The seal 1 may comprise a second damping part 12. The second damping part 12 comprises the second surface 11. A second material forms the second damping part 12. The second material has a second loss factor $\eta_2$ strictly greater than 0.10, in particular strictly greater than 0.15, and preferentially greater than 0.20. Thus, it is possible to increase the sound insulation of each of the glazed units of a double glazed unit assembly comprising the seal 1.

Referring to FIG. 2 and FIG. 3, the seal 1 may comprise a first recess 8 able to receive the edge of the first glazed unit 3 and preferentially a second recess 9 able to receive the edge of the second glazed unit 10, so as to surround the first glazed unit 3 and/or the second glazed unit 10. Thus, it is possible to simplify the manufacture of the seal 1, by manufacturing a single seal surrounding the set of glazed units of a glazed assembly.

With reference to FIG. 2, the first recess 8 and/or the second recess 9 may each form a notch in the seal 1. Thus, the recess 8 makes it possible to install the first glazed unit 3 by surrounding the edge of the first glazed unit 3 on the first face 4, on the second face 5, and on the periphery of the first glazed unit 3.

The first recess 8 and/or the second recess 9 can each form a nook in the seal 1, making it possible to control the position wherein the first glazed unit 3 and/or the second glazed unit 10 is installed in the glazed element 2. FIG. 3 shows a second glazed unit 10 held in the glazed element 2 by the seal 1, the second glazed unit 10 being arranged in the second recess 9 formed by a nook. Preferentially, when a glazed unit is arranged in a nook of the seal 1, the glazed unit can be bonded to the first surface 6 and/or to a second surface 11.

The second recess 9 may have a second surface 11 able to be in contact with the edge of the second glazed unit 10. The second recess 9 may comprise the second damping part 12. The second damping part 12 comprises the second surface 11. The second material forming the second damping part 12 may have a second loss factor $\eta_2$ greater than 0.10, in particular greater than 0.15, and preferentially greater than 0.20.

A value of the real part E' of the Young's modulus of the first material and/or of the second material is less than 100 MPa, in particular less than 10 MPa, and preferentially less than 1 MPa. Thus, it is possible to dissipate the energy of the bending waves of the glazed unit 10 by visco-elastic losses.

Referring to FIG. 2, the seal 1 can be formed from a single material, monolithically. Thus, it is possible to simplify the manufacture of the seal 1, for example by using a single material during extrusion or injection. The inventors discovered that it was possible to choose the characteristics of the material forming the seal 1 so that the seal 1 can hold the glazed unit(s) during the tightening and fastening to an element integral with an aircraft wall, while exhibiting a loss factor making it possible to increase the sound insulation of a glazed element 2 comprising the first glazed unit 3 and the seal 1. Preferentially, when the seal 1 is formed monolithically of one single material, the first loss factor $\eta_1$ is strictly greater than 0.10, in particular greater than 0.15, and preferentially greater than 0.20, and the value of the real part E' of the Young's modulus of the material forming the seal 1 is greater than 1 MPa.

With reference to FIG. 4, the seal 1 can be formed by one or more parts without covering the end of the edge of the first glazed unit 3 and/or of the second glazed unit 10.

With reference to FIG. 5 and FIG. 6, the seal 1 may comprise a holding part 13 different from the first damping part 7. Preferentially, the holding part 13 and the first damping part 7 do not have a common part. The holding part 13 is mounted secured to the damping part 7. The holding part 13 can be configured to be brought into contact with an element integral with an aircraft wall. A third material, preferably visco-elastic, forming the holding part 13 has a third loss factor $\eta_3$ strictly less than the first loss factor, and in particular strictly less than 0.10, preferentially less than 0.05. Thus, the seal 1 can be configured both to be securely mounted on the wall of an aircraft in a similar way to the known seals, as well as to have features making it possible to increase the sound insulation with respect to the known seals by viscous dissipation.

Preferentially, a seal 1 comprising a holding part 13 may have a first loss factor $\eta_1$ greater than 0.20 and preferentially greater than 0.50. Indeed, if the seal 1 comprises a holding part 13, it is possible to adapt the first material and preferentially the second material so as to increase the sound insulation without complicating the implementation of the fastening of the seal 1 to an element integral with the wall of the aircraft. Thus, it is possible to increase the sound insulation of a glazed assembly 2 comprising the seal 1 while facilitating the fastening of the glazed assembly 2 to an element integral with the wall of the aircraft.

A seal 1 comprising a holding part 13 may comprise a first damping part 7 and/or a second damping part 12 having a value of the real part E' of the Young's modulus strictly less than 10 MPa, in particular strictly less than 1 MPa. Thus, it is possible to dissipate the energy of the bending waves of the glazed unit 10 by visco-elastic losses.

The first material and/or the second material are preferentially chosen from a silicone, a nitrile and a polyurethane. The visco-elastic properties of the known materials can be measured by the methods described herein. The first material and/or the second material can have a glass transition temperature comprised between −80° C. and −50° C., inclusive. For example, the first material and/or the second material can comprise a methyl vinyl silicone rubber (MVQ) crosslinked by a benzoyl peroxide. The first material and/or the second material may also be a porous material. The loss factor of the first material and/or the second material can also be adjusted by a tackifying agent, for example a glycerin ester, calcium carbonate or carbon nanotubes. For example, the polyurethane sealant Weberseal PU 40 (registered trademark) of the Weber brand has a loss factor η equal to 0.41 and a value of the imaginary part E' of the Young's modulus equal to 7.2 MPa. For example, the polyurethane sealant Sikaflex PRO-11 FC (registered trademark) of the Sika brand has a loss factor η equal to 0.20 and a value of the imaginary part E' of the Young's modulus equal to 1.2 MPa.

Referring to FIG. 5 and FIG. 6, the seal 1 preferentially comprises a spacer 21 able to separate the first glazed unit 3 from the second glazed unit 10 by a predetermined thickness. The spacer 21 can be a part of the seal 1 arranged between the first recess 8 and the second recess 9. With reference to FIG. 5, the spacer 21 can be formed by the first damping part 7 and by the second damping part 12. Referring to FIG. 6, the spacer 21 can be formed by the holding part 13 and by the first damping part 7 and/or the second damping part 12. With reference to FIG. 6, the first damping part 7 and/or the second damping part 12 may be formed by a layer of polymer material deposited on the holding part 13.

Window 14

Another aspect of the invention is an aircraft window 14 comprising a glazed element 2, the glazed element 2 comprising a second glazed unit 10. The second glazed unit 10 has a third face 15 and a fourth face 16. The second surface 11 is adapted to be mounted on the third face 15 and preferentially on the fourth face 16 so as to receive the second glazed unit 10.

Preferentially, the first glazed unit 3 and/or the second glazed unit 10 of a window 14 are each a monolith, preferentially formed from polymethyl methacrylate (acronym PMMA).

With reference to FIG. 6, the window 14 makes it possible to increase the sound insulation in the medium and high audible frequencies, in particular in a frequency range between 200 Hz and 1300 Hz, and preferentially in a frequency range between 350 Hz and 450 Hz. These frequency ranges can comprise the resonant frequency of the two glazed units of the window 14.

FIG. 7 shows a simulation by the finite elements method of the sound insulation (TL for transmission loss) through three windows. Each of the three simulated windows comprises glazed units having a maximum diameter of 520 mm. The first glazed unit 3 is made of PMMA and has a thickness of 12.7 mm. The second glazed unit 10 is made of PMMA and has a thickness of 6.1 mm. The first glazed unit 3 and the second glazed unit 10 are separated by 5 mm of air. The seal of each of the simulated windows has a value of the real part E' of the Young's modulus equal to 3 MPa and a Poisson's ratio equal to 0.49.

The curve (a) shows the sound insulation for a known window that does not comprise a seal.

The curve (b) shows the sound insulation for a known window comprising a seal formed by a material having a loss factor η equal to 0.001. The curve (b) shows an increase in the decoupling frequency between the first glazed unit 3 and the second glazed unit 10 during the use of a known window, with regard to a seamless window.

The curve (c) shows the sound insulation for a window 14 according to one embodiment of the invention, which comprises a seal comprising a first damping part 7 and a second damping part 12 having respectively a first loss factor $\eta_1$ and a second loss factor $\eta_2$ each equal to 0.7. The curve (c) shows an increase in the sound insulation during the use of a window according to one embodiment of the invention with regard to known windows.

Windshield

Another aspect of the invention is an aircraft windshield, comprising a glazed element 2. The first glazed unit 3 of the glazed element 2 may be a laminated glazed unit. The windshield can comprise, as single glazed unit, the first glazed unit 3, that is, it does not comprise a second glazed unit 10.

Referring to FIG. 8, the windshield makes it possible to increase the sound insulation in particular in audible low and medium frequencies, in particular in a frequency range between 50 Hz and 3 kHz.

FIG. 8 shows a simulation by the finite elements method of the sound insulation through two windshields. Each of the two simulated windshields comprises a first laminated glazed unit 3.

Another aspect of the invention is an aircraft windshield, comprising a glazed element 2. FIG. 9 schematically shows an aircraft windshield 900. The first glazed unit 3 of the glazed element 2 may be a laminated glazed unit. The windshield can comprise, as single glazed unit, the first glazed unit 3, that is, it does not comprise a second glazed unit 10.

The curve (e) shows the sound insulation for a windshield according to one embodiment of the invention, which comprises a seal 1 comprising a first damping part 7 having a first loss factor $\eta_1$ equal to 0.5. The curve (e) shows an increase in the sound insulation during the use of a windshield according to one embodiment of the invention with regard to a known windshield.

Method for Manufacturing the Seal 1 and Attaching a Glazed Element 2 in an Aircraft Another aspect of the invention is a method for manufacturing the seal 1.

The method for manufacturing the seal 1 may comprise a step of extruding the seal 1. The extrusion of the seal 1 can be implemented from the first material so as to form the first damping part 7 and preferentially from the second material so as to form the second damping part 12.

The method for manufacturing the seal 1 may comprise a step of co-extruding the seal 1. The co-extrusion of the seal 1 can be implemented from the first material having a loss factor $\eta_1$ strictly greater than 0.10 so as to form the first damping part 7, and from the third material having a third loss factor $\eta_3$ strictly less than the first loss factor, and especially strictly less than 0.10, so as to form the first holding part 13. The co-extrusion can also be implemented from the second material having a third loss factor $\eta_2$ strictly greater than 0.10 so as to form the second damping part 7.

Following the extrusion step or the co-extrusion step of the seal 1, the seal 1 may have two ends. The method for manufacturing the seal 1 may comprise a step subsequent to the extrusion or coextrusion step, wherein the two ends of the seal 1 are welded together.

Alternatively, the method for manufacturing the seal 1 may comprise a step of injecting the seal 1 onto the edge of a glazed unit. Preferably, the manufacturing method comprises a first step of injecting the first material and a second step of injecting the second material and/or of the third material.

The invention claimed is:

1. A seal of a glazed element of an aircraft, the seal being configured to receive an edge of a first glazed unit, the first glazed unit having a first face, the seal comprising a first surface adapted to be mounted on the first face so as to receive the first glazed unit, wherein the seal comprises a first damping part, the first damping part comprising the first surface, and wherein a first material forming the first damping part has a first loss factor $\eta_1$ strictly greater than 0.10.

2. The seal according to claim 1, wherein the first surface is adapted to be mounted on the first face and on a second face of the first glazed unit opposite the first face, so as to receive the first glazed unit.

3. The seal according to claim 1, comprising a first recess able to receive the edge of the first glazed unit so as to surround the first glazed unit, the first recess comprising the first damping part.

4. The seal according to claim 1, comprising a second recess able to receive an edge of a second glazed unit so as to surround the second glazed unit, the second recess having a second surface suitable for being in contact with the edge of the second glazed unit, the second recess comprising a second damping part, the second damping part comprising the second surface, a second material forming the second damping part having a second loss factor $\eta_2$ greater than 0.10.

5. The seal according to claim 1, wherein the first recess forms a notch in the seal.

6. The seal according to claim 1, formed from a single material monolithically.

7. The seal according to claim 1, wherein a value of a real part E' of the Young's modulus of the first material is less than 100 MPa.

8. The seal according to claim 7, wherein a value of the real part E' of the Young's modulus of the first material is less than 10 MPa.

9. The seal according to claim 1, comprising a holding part different from the first damping part, the holding part being configured to be placed in contact with an element integral with a wall of the aircraft, a third material forming the holding part having a third loss factor $\eta_3$ strictly less than the first loss factor.

10. The seal according to claim 9, wherein the third loss factor $\eta_3$ is strictly less than 0.10.

11. The seal according to claim 9, wherein the third material is a visco-elastic material.

12. The seal according to claim 9, wherein the first loss factor $\eta_1$ is greater than 0.20.

13. The seal according to claim 12, wherein the first loss factor $\eta_1$ is greater than 0.50.

14. The seal according to claim 9, wherein a value of a real part E' of the Young's modulus of the first material is less than 10 MPa.

15. The seal according to claim 14, wherein a value of the real part E' of the Young's modulus of the first material is less than 1 MPa.

16. An aircraft glazed element, comprising:
a seal according to claim 1,
a first glazed unit,
the first surface being mounted on the first face so that the seal receives the first glazed unit.

17. An aircraft windshield, comprising a glazed element according to claim 16, wherein the first glazed unit is a laminated glazed unit.

18. An aircraft window comprising a glazed element according to claim 16, the glazed element further comprising a second glazed unit, the second glazed unit having a third face and a fourth face, the seal comprising a second surface adapted to be mounted on the third face.

19. The aircraft window according to claim 18, wherein the second surface is adapted to be mounted on the fourth face so as to receive the second glazed unit.

* * * * *